Nov. 30, 1937.    M. W. CARROLL    2,100,684
WELL BRIDGING, CEMENTING, WHIPSTOCK, AND MILLING APPARATUS
Filed March 28, 1936    5 Sheets-Sheet 3
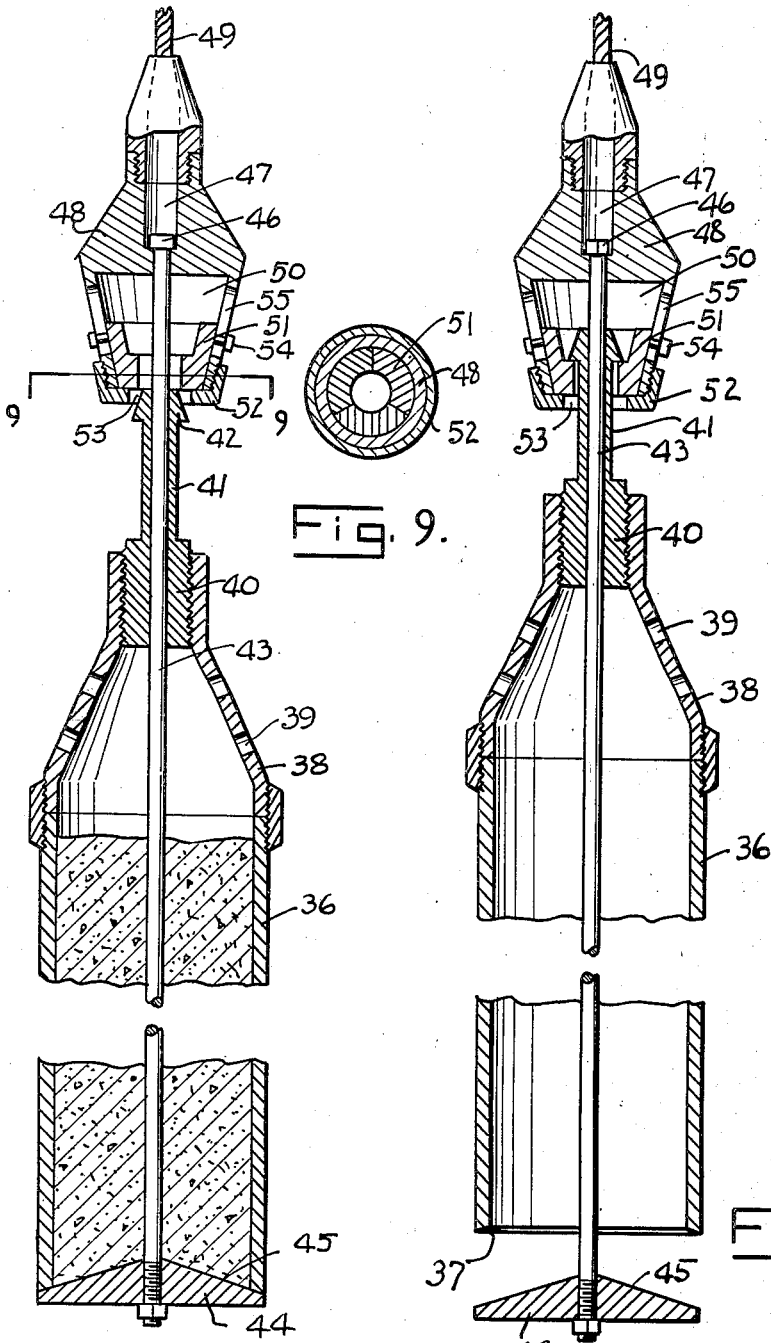
INVENTOR.
Monroe W. Carroll
BY Jesse R. Stone
Lister B. Clark
ATTORNEYS Nov. 30, 1937.   M. W. CARROLL   2,100,684
WELL BRIDGING, CEMENTING, WHIPSTOCK, AND MILLING APPARATUS
Filed March 28, 1936   5 Sheets-Sheet 4
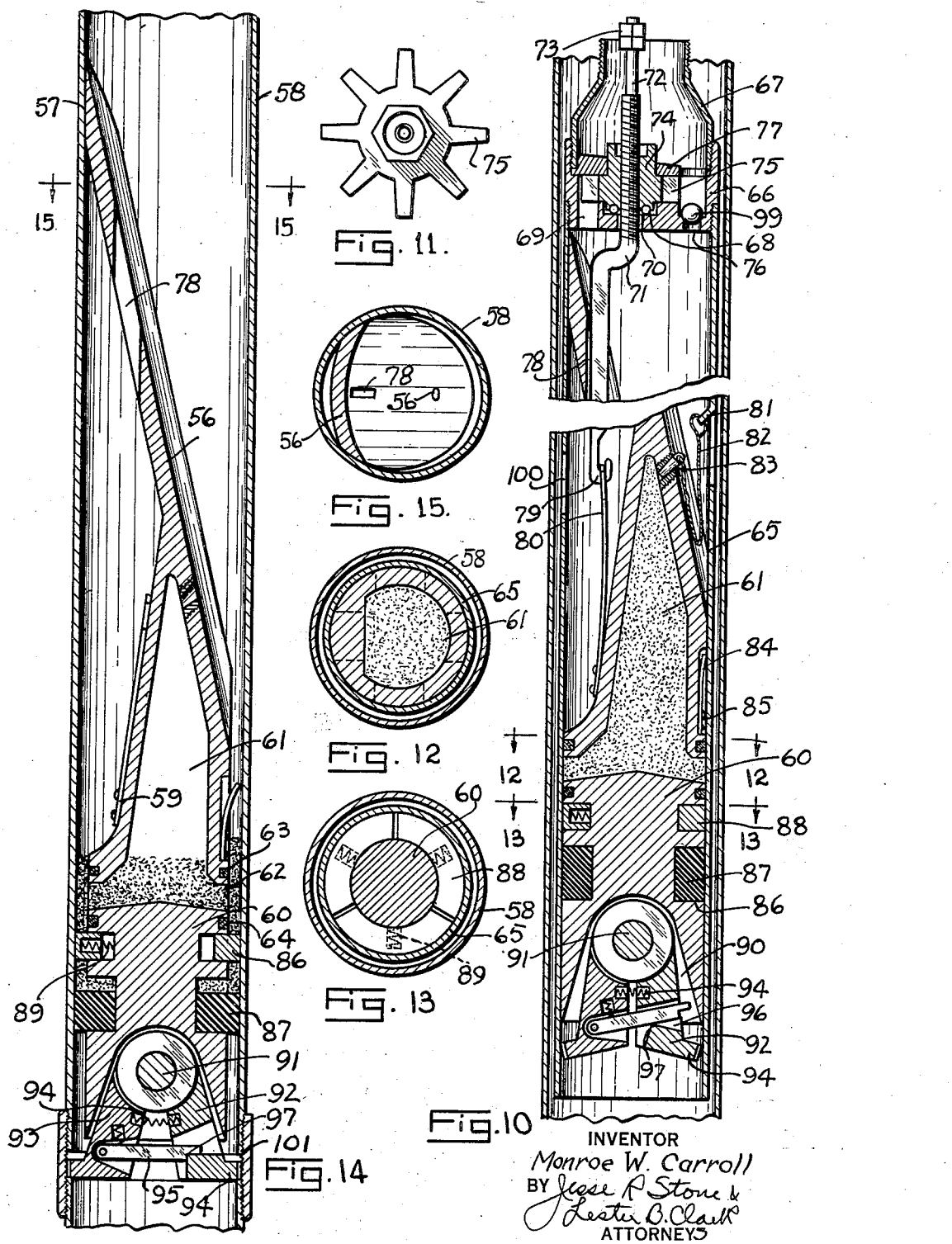
INVENTOR
Monroe W. Carroll
BY Jesse P Stone &
Lester B Clark
ATTORNEYS Nov. 30, 1937.                M. W. CARROLL                2,100,684
WELL BRIDGING, CEMENTING, WHIPSTOCK, AND MILLING APPARATUS
Filed March 28, 1936        5 Sheets-Sheet 5

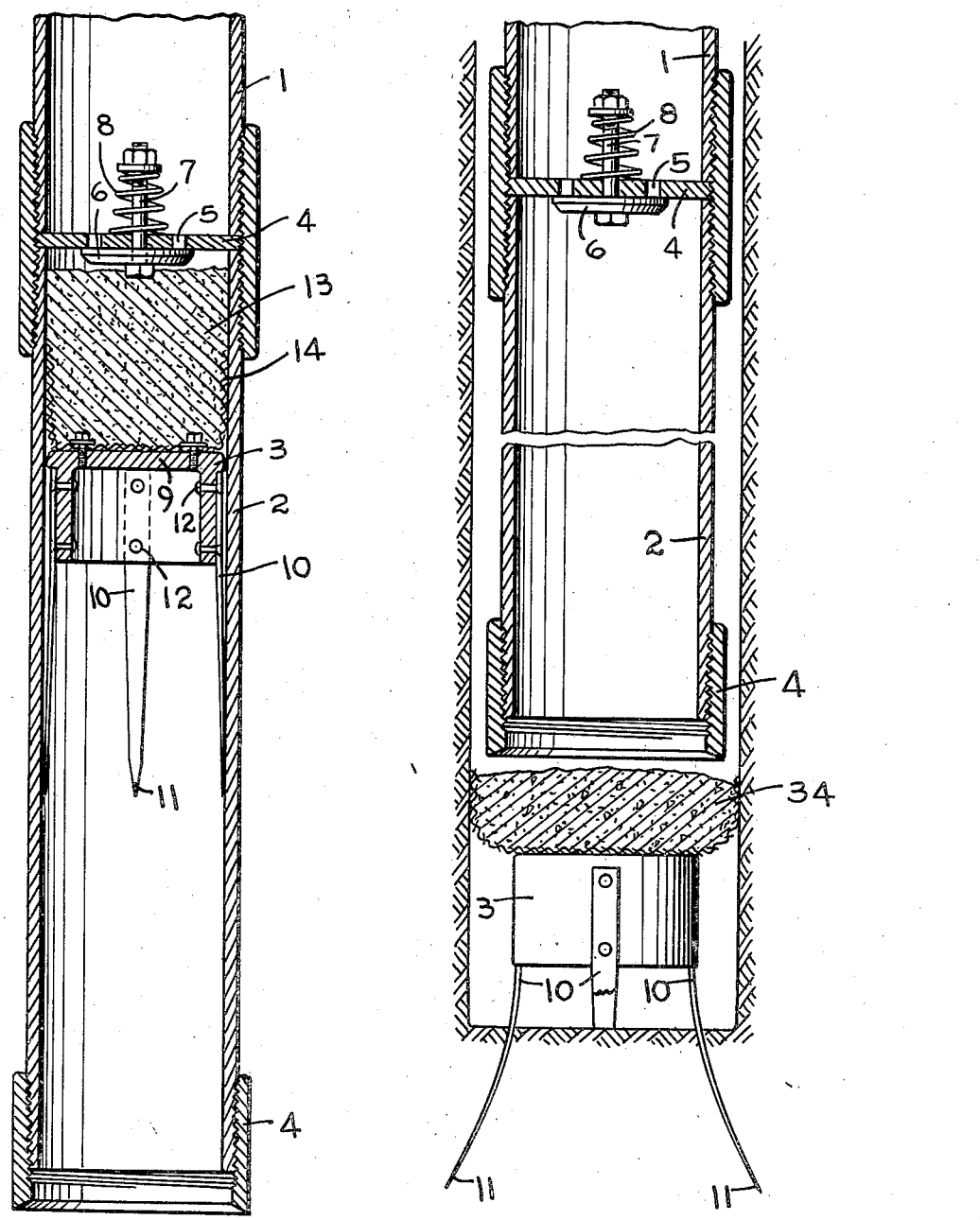

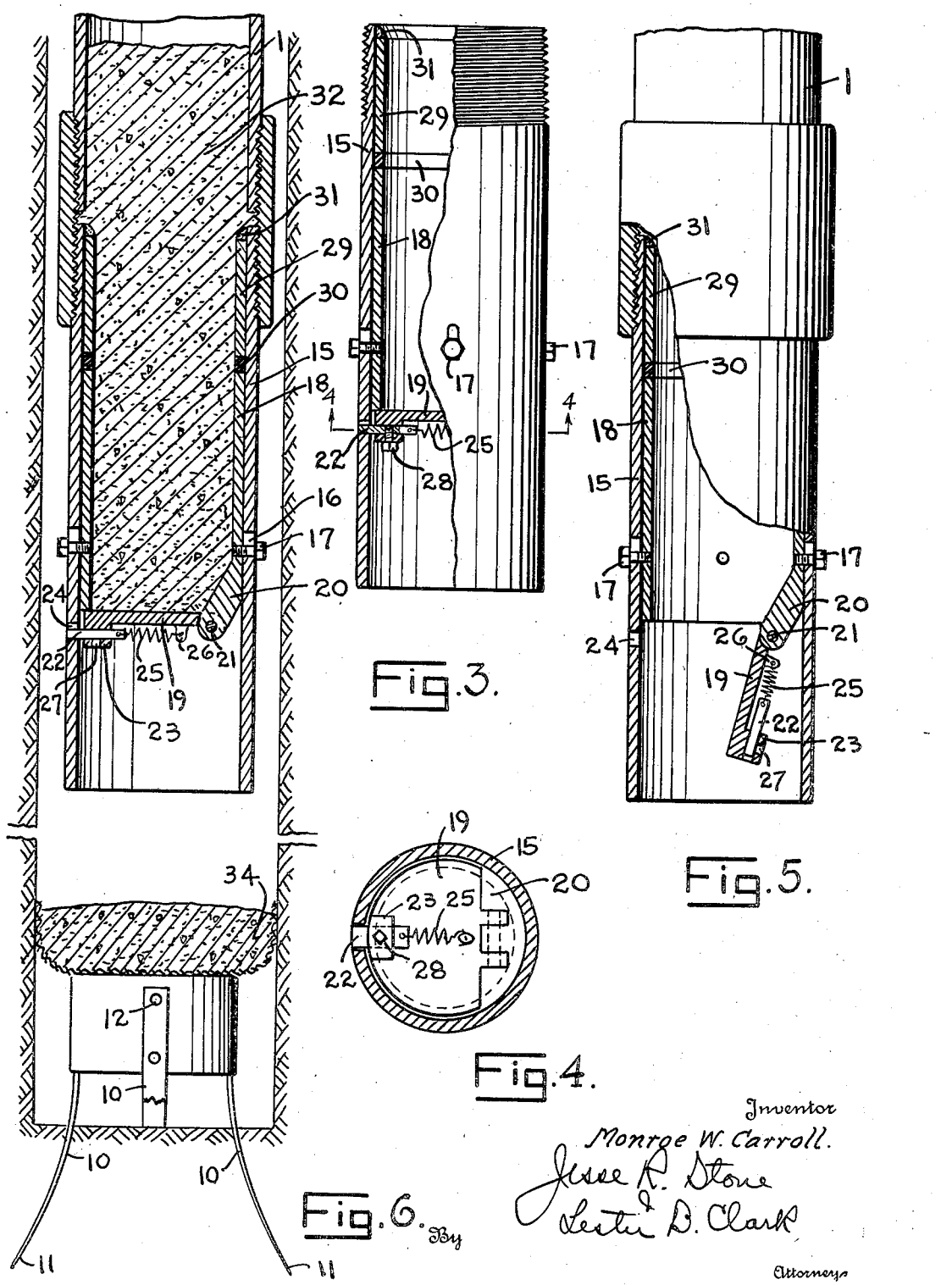

INVENTOR.
Monroe W. Carroll
BY Jesse R. Stone
Lester B. Clark
ATTORNEYS

Patented Nov. 30, 1937

REISSUED
DEC 24 1940

2,100,684

UNITED STATES PATENT OFFICE 2,100,684

WELL BRIDGING, CEMENTING, WHIPSTOCK, AND MILLING APPARATUS

Monroe W. Carroll, Beaumont, Tex.

Application March 28, 1936, Serial No. 71,474

7 Claims. (Cl. 255—1)

My invention relates to various operations in the drilling of deep wells including milling through casing, cementing and setting supports in the well bore.

In the drilling of deep wells for oil, gas, sulphur, water and the like it is not uncommon to pierce a stratum of producing material but on account of poor showing therein the drilling is continued down past the stratum having the showing of oil or gas therein. It is not unusual to find several different strata of formation all of which will produce some amount of the desired fluid. When it later becomes desirable to cement above and below each of the producing strata it is difficult or impossible to do so with accuracy on account of the limitations in the present equipment.

It is an object of my invention to provide means whereby a plug or bridge of cement or other material may be located at the desired level in the well so that a bridge may be formed at that point.

I desire to provide a support which, when discharged from the operating pipe, will automatically engage with the walls of the well and form a support.

It is also an object of the invention to provide means whereby a charge of cement may be lowered in the well to the desired level and then released.

Another object of the invention is to provide in a cement discharging device means which may be automatically released in response to fluid pressure in the well.

Another object of the invention is to provide a supporting valve or plate which may be rendered ineffective to support the cement at any desired point in the well.

Another object of the invention is to provide a cement container attached to a cable which when lowered to the bottom of the well, will be automatically unloaded.

Another object of the invention is to provide a whipstock, having cement within its body, and supporting dogs attached to the lower end to engage pipe coupling at the point desired to act in side tracking operations to deflect the cutter to mill through casing.

Another object of the invention is to provide a feeding mechanism for the drilling string adapted to be attached to draw works or cable, to control the downward movement of the milling tool, at the lower end of said string.

I desire to control the speed of lowering the milling tool so that an accurate uniform rate of movement can be mechanically maintained.

Referring to the drawings herewith, Fig. 1 is a central longitudinal section through a portion of the operating pipe showing the construction of my support.

Fig. 2 is a similar view showing the support when discharged from its position in the pipe.

Figure 3 is a broken side view partly in section showing my automatically releasing support for cement.

Fig. 4 is a transverse section on the plane 4—4 of Fig. 3.

Fig. 5 is a broken side view partly in section showing the apparatus disclosed in Fig. 3 with the valve in open position.

Fig. 6 is a longitudinal section showing the lower end of a well with my support therein and the valve discharging mechanism in position above the same.

Fig. 7 is a longitudinal section of a form of cement bucket filled with cement.

Fig. 8 is a similar view showing the cement dumped.

Fig. 9 is a transverse section on the plane 9—9 of Fig. 7.

Fig. 10 is a central longitudinal section through a whipstock.

Fig. 11 is a plan view of an impeller wheel which I use.

Figs. 12 and 13 are transverse sections on the planes 12—12 and 13—13, respectively, of Fig. 10.

Fig. 14 is a longitudinal section similar to Fig. 10 but showing the whipstock anchored in position.

Fig. 15 is a transverse section on the plane 15—15 of Fig. 14.

Figure 16:
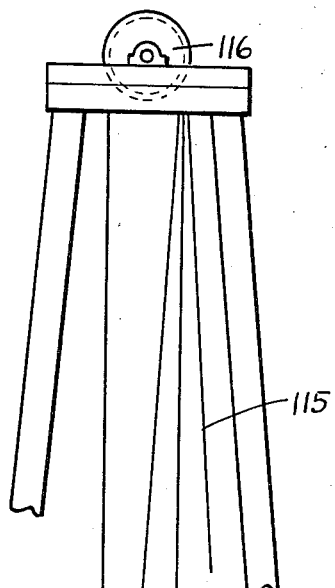

Fig. 16 is a broken diagrammatic view showing my drill stem feed control.

Figure 17:
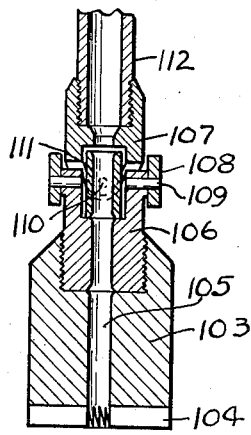

Fig. 17 is a longitudinal section through my jointed milling tool.

Figure 18:

Fig. 18 is a plan view of a star wheel.

Figure 19:
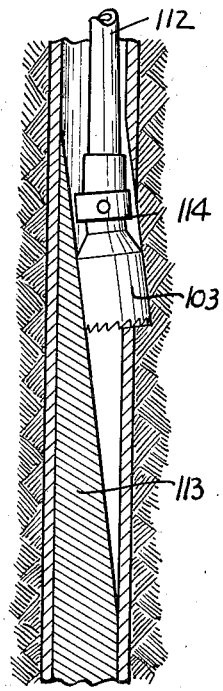

Fig. 19 is a longitudinal section of a well showing the use of my milling tool.

In placing a support for cement and the like at a desired level in the well I employ an apparatus similar to that disclosed in Figs. 1 and 2. In this device I secure at the lower end of the operating pipe or liner 1 a section of pipe 2 which forms a temporary housing for my supporting piston 3. The pipe or housing 2 is preferably formed with a set shoe 4 at the lower end. At its upper end and between the same and the lower section of the pipe 1 I place a partition or diaphragm 4 formed with openings 5 therethrough normally closed by a back pressure valve 6 mounted upon a stem 7 and held normally in closed position by a spring 8. This is a common type of back pressure valve.

The supporting piston 3 within the lower section of the pipe is preferably formed of cupshape, the lower end being open and the upper end being closed by a wall 9 of metal. On the sides of the piston and preferably countersunk therein are a plurality of spring arms 10 which project well below the lower end of the piston and are sharpened off to a point 11. These spring arms are normally curved so that they will project strongly outwardly away from the body of the piston. The arms may be secured to the piston by bolts or rivets 12 and when the piston with the arms therein is housed within the lower section 2 of the pipe the arms engage frictionally against the inner wall of the pipe but are slidable downwardly therein.

This piston is intended to support a load of cementitious material shown at 13 and I prefer to place a layer of fabric such as canvas or burlap 14 thereon. As seen in Fig. 1, this fabric forms a container for the cement assisting in preventing the cement, which is in fluid form, from flowing outwardly past the piston.

When it is desired to set a bridge at any position in the well the pipe is lowered until the lower end thereof is adjacent the point where the well is to be closed across by the bridge. This may be in an open hole or may be, as is seen in Fig. 2, adjacent the bottom thereof, or it may be even in a section of casing already set. If in an open hole the fluid pressure is exerted downwardly through the pipe 1 and past the back pressure valve upon the cement and enough force will be exerted to force the piston out the lower end of the pipe so that the spring arms 11 may be forced outwardly to engagement with the formation where they will support the piston in that position. The cement will flatten out so that the walls of canvas support will engage the sides of the hole and support the cement, as shown in Fig. 2, where it may be allowed to harden.

It will be understood that if the piston is discharged into a section of casing the lower ends of the spring arms 11 will engage between the ends of the adjacent pipe sections and support the piston in position in the casing. With this apparatus I am enabled to form a bridge or stop at any desired level in the well, as will be obvious.

In order that this support may be employed in connection with cementing above the plug or bridge to any desired level I desire to employ my apparatus shown in Figs. 3 to 6 inclusive to lower a larger body of cement to a position above the bridge and discharge this larger body of cement above the bridge so as to completely close the well below or above the lower end of the pipe or liner, as is customary in cementing wells. My cement is placed within the pipe 1 at the lower end and in place of the section 2 of the pipe shown in Fig. 1 I may place a different section of pipe shown at 15. This pipe has opposite longitudinal openings 16 therein through which cap screws or bolts 17 are adapted to extend and to be allowed a limited longitudinal movement therein.

In the operation of this device the assembly at the lower end of the pipe will be closed as seen in Fig. 3 and the locking bolt 22 will be held closed against the action of the spring 25 by means of the set screw 28. The pipe will then be filled with cement, shown at 32, to the desired height, said cement bearing upon the plate 19 with sufficient weight or force to frictionally force the bolt 22 against the wall of the opening 24 and thus tend to hold it in locked position. The screw 28 may then be removed and the device lowered into the well. It will be seen that the bolt will remain locked to hold the plate 19 in closed position during the time the load of cement is lowered to the point where the fluid pressure in the well is greater than the weight of cement in the container at that point. There is then a pressure upwardly around the lower end of the pipe and against the plate 19. This pressure will be raised to a sufficient value to counteract the load of cement 32 and allow the spring 25 to act upon the bolt 22 and remove it from locked position. The pressure of the fluid in the well against the bottom of the plate 19 will move the sleeve or housing 18 slightly upward against the flexible ring 30 sufficient to allow the ready removal of the locking bolt. This upward movement of the housing 18 is accommodated by the movement of the screws 17 in slot 16 in an obvious manner.

The lowering of cement continues until the place for dumping the cement is reached, then the fluid pump is started to force the cement out of the container as seen in Fig. 5.

The screws 17 are set in the wall of a nipple or sleeve 18 fitting closely within the pipe 15 and extending somewhat below the screws 17 and normally closed at its lower end by a valve or plate 19. Said plate is hinged to a lower inclined wall 20 of the nipple or sleeve 18 by means of a pivot pin 21. Said plate is adapted to close the lower end of the housing and is held in closed position by a locking bolt 22. Said bolt is slidable through a downwardly projecting lug 23 in the plate and when in locking position projects outwardly through a hole 24 in the outer pipe section 15. This bolt is acted upon by a spiral tension spring 25 secured at its outer end to a lug 26 on the plate and exerting a pull upon the locking bolt 22 tending to remove it from its locking position engaging within the wall of the pipe 15. On the lower side of the lug 23 through which the bolt projects I form an opening 27 through which a set screw 28 may be secured to engage through or against the locking bolt 22 and hold it in locked position.

Above the housing sleeve 18 is a second short section of pipe 29 separated from the lower sleeve 18 by a ring of soft material 30 such as rubber adapted to be longitudinally compressed by the upward movement of the sleeve 18. Above the section of pipe 29 is a bond of welding material 31 securing the said section 29 rigidly in position.

When this plate has thus dropped to open position the cement within the pipe 1 will be discharged downwardly into the hole above the bridge 34 formed as previously described.

It will thus be seen that I can accurately place a bridge in position at any desired level in the well whether the well has been cased or not and when this bridge has been allowed to harden any desired amount of cement may be discharged into the hole above the bridge. My automatically releasing device which I have described enables the cement to be lowered to the desired level and there discharged. It will fill the lower end of the hole above the bridge which has been set and perform the cementing operation in the usual manner. The advantages of this apparatus will be readily understood by those skilled in the art.

In Figs. 7, 8 and 9 I have illustrated another form of bucket for lowering the cement into the well. This bucket may be used in place of the bucket 15 previously described. In this modification I provide a cylindrical bucket member 36, the lower end of which has an upwardly tapered seat 37 thereon. The bucket is connected with an upwardly tapered nipple at 39. The upper end of the nipple has a threaded engagement with a plug 40 whose upper end is reduced in diameter and extended upwardly at 41 and has a head 42 thereon for engagement with a grapple or fishing tool.

The plug 40 and the upward extension thereon has an axial passage to receive a valve control rod 43. The rod extends downwardly through the bucket and has at its lower end a valve or closure 44, the upper face of which is tapered at 45 to engage the seat 37. The rod 43 extends above the bucket and the head 42 and has at its upper end a squared head 46 to engage within a recess 47 in a lowering device 48.

Said device 48 is secured at the lower end of the cable 49 by means of which the device is lowered into the well. The recess 47 extends downwardly into the body of the device and limits the downward movement of the rod relative thereto. In the lower end of the lowering device is a chamber 50 with downwardly sloping sides to receive the slips 51.

The lower end of the chamber is closed by a cap 52 having an opening 53 therein large enough to allow the passage therethrough of the head 42 on the bucket extension. Each of the slips 51 has an outwardly extending screw or bolt 54 thereon to slide within a longitudinal slot 55 in a side wall of the chamber 50.

When this device is assembled for introducing the cement into the well the rod 43 is pulled upwardly to place the valve 44 in closed position. The bucket is then filled with cement and the upper nipple 38 secured in position thereon with the rod 43 extending upwardly as shown in Fig. 1. The head of the rod is engaged within the recess 47 in the lowering device.

The device is then lowered into the well until the bridge 34 or other support is reached thus stopping the downward descent of the bucket. The further lowering of the cable will allow the member 48 to drop downward over the head 42 on the upper end of the bucket. The said head will move the slips upwardly in the chamber 50 until the head has passed into the chamber above the slips. The slips will then drop down into the position shown in Fig. 8, engaging below the head 42. The lowering device will then be pulled upwardly to engage the head 42 and pull the bucket upwardly relative to the valve, moving the bucket into the position shown in Fig. 8, allowing the cement to be discharged outwardly into the well. The bucket may then be drawn upwardly allowing the cement to flow downwardly into the well above the bridge and may be removed from the well leaving the cement in position.

In operations of this character it may be found necessary to sidetrack an opening through the casing and into the formation at the side of the hole. In Figs. 10 to 14, inclusive, I have shown how the whipstock may be set in position in the manner similar to that just described. In Fig. 10 to Fig. 14, inclusive, I have shown a whipstock which may be thus supported. This whipstock is made as light as possible consistent with the structure which is necessary. Its upper end has an inclined plate 56 which is preferably concaved between its sides so as to better engage with a milling cutter. The upper end of the plate 56 is curved and beveled at 57 to conform to the inner surface of the well casing 58. The lower end of the whipstock has a cylindrical body member 60, which is hollowed out to form a chamber 61 in which cement may be placed. At the lower end of the chamber above the head are lateral openings 62 through which the cement may be discharged, and above and below these lateral openings are packing rings 63 and 64 which are adapted to engage with the inner wall of a housing 65 shown in Fig. 10.

The housing 65 is a cylindrical section of pipe, the upper end of which is engaged with a coupling 66 which is in turn connected by swaged nipple 67. Within the coupling member 66 is a transverse partition across the housing which has two longitudinal fluid passages 68 and 69 therethrough, one at each side thereof and there is also a longitudinal opening 70 through which a threaded stem 71 may pass.

The stem 71 extends upwardly through the partition and has an unthreaded portion 72 adjacent the upper end and lock nuts 73 are screwed on this reduced portion of the rod. Threaded onto the rod adjacent the partition is a nut 74 which is adapted to be rotated while the device is in the well by radial impeller blades 75 shown best in Fig. 11. The lower end of the nut rests upon an anti-friction bearing race 76 on the upper end of the partition within the coupling 66. The nut is held rotatably in position adjacent the partition by an upper plate 77 secured upon the coupling 66 by means of the nipple 67. By this construction the rotation of the nut 77 through the circulation of liquid past the impeller blades will move the threaded rod vertically in the housing.

The lower end of the stem 71 is curved laterally and extended directly downward through an opening 78 in the deflecting part 56 of the whipstock. At its lower end the rod is formed with a hook 79 which engages with the upper end of a spring arm 80, which is secured at 59 to the side wall of the cement chamber 61.

On the inner wall of the housing 65 an arm 81 is extended inwardly and formed with an eyelet to connect with a cord or chain 82 to which is attached a tapered plug 83. Said plug is set within a tapered opening in the upper wall of the cement chamber 61 and is employed as will be later noted in removing the plug when the cement is to be discharged.

On the side wall of the cement chamber 61 exterior thereto is a spring arm 84 which is secured within a recess in the outer periphery of the cement chamber by rivets 85, or otherwise, said spring bearing against the side wall of the housing in such manner as to tend to move the same away from that wall adjacent thereto and thus act to hold the upper end 57 against the wall of the housing.

The head 60 of the whipstock has a peripheral recess or groove 86 therein to receive a rubber packer 87. This packing ring is normally approximately square in cross section as shown in Fig. 14, but when the head is placed within the housing 65 this rubber is compressed radially and expanded into the form shown in Fig. 10, which is elongated vertically. When thus compressed it tends to bear outwardly against the housing.

Above the housing is a peripheral groove in which are housed a plurality of arcuate dogs 88 shown best in Fig. 13. These dogs are held resiliently outward by spring 89 housed within the dogs and bearing against the interior wall of the groove in which they fit. These dogs tend to form supports for the cement as will be later noted.

At the lower end of the head of the whipstock is an upwardly extending recess 90 across which is extended a pin or shaft 91. Pivoted on this shaft are two downwardly depending dogs 92 and 93. These dogs are held resiliently apart by a coil spring 94 fitting within opposed recesses on the adjacent sides of the two dogs. The lower ends of the dogs have outwardly extending fingers 94 thereon to engage within recesses in the casing, as will be later noted. Pivoted within one of the dogs 93 is a latch member 95 which extends into an opening 96 through the opposed dog 92 and has a notch cut in its free end to engage over a shoulder 97 on the dog 92. This latch is held resiliently downward by a spring 98 in the dog 93. Both these dogs are pivotally supported on the shaft 91 and are normally compressed within the housing 65.

When this device is to be lowered and anchored in the well it is assembled with the cement in position as shown in Fig. 10 and the housing with the device therein is lowered to the position approximately where the device is to be anchored. When in this position a ball 99 is dropped downwardly into the position shown within the channel 68 through the coupling 66. When in this position the passage of flushing fluid through this opening will be prevented and the pumps will be started to cause a circulation of liquid through the device. The liquid will pass into the channel 68 but as it cannot pass therethrough it will be deflected laterally to the channel 69 and will be discharged therefrom with some force. The rapid flow of the fluid under pressure will rotate the impeller 75 and thus cause the rotation of the nut 74 and screw the shaft 71 downwardly therethrough. The fluid passing the pump will find an exit through lateral openings 100 in the side wall of the housing. When the rod 71 has been moved downwardly until lock nuts 73 rest on nut 74 the whipstock 60 will have been lowered in the housing sufficiently to permit the dogs 92 and 93 to be out of the housing and to contact with the casing wall. Then the apparatus is lowered in the well casing until the dogs 92 and 93 contact the casing coupling as shown at 101 in Fig. 14. Then the housing 65 is lowered a sufficient distance so that the spring arm 80 will be released from the hook 79 and will automatically snap back against the wall of the whipstock as shown in Fig. 14. This will release the whipstock so that it may be moved downwardly by the fluid pressure and it will be forced downwardly through the housing and extend below the same. When this is done the latching dogs 92 and 93 at the lower end thereof will be moved laterally to engage in recesses between the ends of the pipe at a coupling such as 101 in Fig. 14.

The housing may then be pulled upwardly away from the whipstock and when this is done the plug 83 at the upper end of the cement chamber will be removed from its position. The whipstock will then be supported in the well approximately as shown in Fig. 14. The removal of the device from the housing will allow the packer 87 to expand and seal against the inner wall of the casing 58. The circulation of fluid will allow the water to enter through the opening previously filled by the plug 83 and wet the cement and allow it to circulate outwardly through the openings 62. This cement will fill the space around the whipstock and above the packer as indicated in the drawings and when the cement is set the device will be firmly anchored in position held partly by the latching dogs 92 and 93 and partly by the setting of the cement around the same and within the walls of the casing. The device will then be ready for side tracking operations.

In Figs. 17 and 19 is shown a milling tool which I contemplate employing for such operations. The milling tool 103 is a cylindrical head having milling teeth 104 at the lower end and a central fluid passage 105 axially through the same. This head has an upper threaded socket in which is engaged a drill collar including two flexibly connected members 106 and 107. This connection is formed by an ordinary type of universal joint including a ring 108 secured pivotally at 109 to the upper end of a member 106. The member 107 has two downwardly extending arms pivoted at 110 to the ring 108. This is a type of gimbal joint which is well understood.

Within the flexible joint the fluid passage is slightly enlarged and the collar 111 is set therein. This collar may be of rubber and is intended to prevent some of the leakage of fluid which would otherwise occur, it being necessary to carry some of the flushing fluid directly through the bit. Part of the fluid, however, will escape around the joint into the well.

In Fig. 19 it will be noted that when this device is used the flexible joint by means of which the milling cutter 103 is secured to the drill stem 112 allows the bit to be diverted by the whipstock 113 so as to more readily cut a window 114 in the side wall of the casing. This window will be sufficient to direct a milling cutter of ordinary construction through the wall of the casing and will avoid the difficulty which is now generally experienced in getting a drill started through the casing in the manner desired. This type of cutter is specially adapted for the cutting of the casing in the manner noted.

When the milling cutter is moved downwardly in this manner to cut the wall of the casing it is essential that it be lowered with a slow and uniform speed. In ordinary usage the driller finds it very difficult to control the downward drop of the drill stem and the cutter thereon so that a successful cut may be made.

In Fig. 16 I have shown a means by which lowering of the drill stem may be accurately controlled. The upper end of the drill stem is secured to the usual kelly joint 113 which is suspended in the usual manner from the traveling block 114 which is suspended by the cable 115 from the crown block 116 of the derrick. The line from these blocks is carried down around the hoisting drum 116 adjacent the derrick platform. This drum is equipped with a brake band 117 controlled by the brake handle 118.

When the drill is to be lowered the driller ordinarily loosens up on the brake lever and allows some of the cable to unreel, but in doing so the weight placed upon the milling cutter is not uniform and good results are not obtained. I secure to the drilling line 115 by means of a clamp 119 an auxiliary cable 120 which is wound about a small auxiliary drum 121. I control the movement of the drum 121 so as to allow the cable 120 and the cable 115 to unreel uniformly. In accomplishing this I form a worm wheel 122 upon the shaft of the drum 121. This worm wheel engages with the worm 123 upon a shaft 124. This shaft has on its end adjacent the rotary table 125 a star wheel 126, the construction of which is shown in Fig. 18. The points of this star wheel are engaged by a laterally extending pin 127 on the rotary table with each revolution of the rotary. I may by varying the number of teeth on the star wheel vary the speed with which the worm is rotated and the drum also rotated to unreel the cable. Thus as the drill stem is rotated the cable will be fed uniformly downwardly so as to lower the bit with the speed desired. This control as will be understood is practically automatic leaving the driller free to handle the drilling apparatus without necessity of attempting to control the uniform lowering of the cutter.

It will be understood that the various improvements set out herein enable the operator to more successfully cement and anchor devices in the well and to perform the operations of side tracking through the casing at any desired level in the well.

What is claimed as new is:

1. A cylindrical housing, an inclined whipstock in said housing, a lower cylindrical head on said whipstock, a packer on said head and means responsive to the flow of fluid past said whipstock to move said whipstock, set said packer and anchor same in the well casing.

2. A cylindrical housing, a whipstock therein having an upper inclined face, a base for said whipstock, a packer thereon engaging said housing, means to secure said whipstock in said housing releasable in response to fluid circulation, and anchor dogs adapted to be expanded to anchor said whipstock when said whipstock is moved out of said housing.

3. A cylindrical housing, a whipstock therein having an upper inclined face, a base for said whipstock, a packer thereon engaging said housing, a cement containing chamber in said base, means to seal said chamber when said whipstock is in said housing, means to secure said whipstock in said housing releasable in response to fluid circulation, and anchor dogs adapted to be expanded to anchor said whipstock when said whipstock is moved out of said housing.

4. A cylindrical housing, an inclined whipstock in said housing, a lower cylindrical head on said whipstock, a packer on said head and means responsive to the flow of fluid past said whipstock to move said whipstock downwardly out of said housing, an anchor on said head, means automatically to engage said anchor with the well casing when said head is moved from said housing, the pressure of said fluid acting to set said packer.

5. A cylindrical housing, a whipstock therein including a head, means to secure said whipstock in said housing releasable in response to the flow of fluid in said housing, a cement chamber in said head, means to close said chamber opening by the relative downward movement of said whipstock in said housing, and an anchor on said head below said chamber operative when said whipstock is moved free of said housing.

6. A whipstock including a head, an anchor operable to engage within the joint of a casing, and means to discharge cement about said head to fix the same in said casing responsive to the flow of fluid downwardly in said casing.

7. A whipstock including a head, an anchor operable to engage within the joint of a casing, means to hold said anchor in inoperative position releasable by relative downward movement of said anchor, and means to discharge cement about said head to fix the same in said casing responsive to the flow of fluid downwardly in said casing.

MONROE W. CARROLL.